Jan. 15, 1952 C. J. THATCHER 2,582,297
AIR CONDITIONING UNIT AND EXPANSION MOTOR THEREFOR
Filed April 10, 1945 5 Sheets-Sheet 1

INVENTOR
CHARLES J. THATCHER
BY
Bartlett, Eyre, Keel & Weymouth
ATTORNEYS

Jan. 15, 1952     C. J. THATCHER     2,582,297
AIR CONDITIONING UNIT AND EXPANSION MOTOR THEREFOR
Filed April 10, 1945     5 Sheets-Sheet 2

INVENTOR
CHARLES J. THATCHER
BY
Bartlett, Eyre, Keel & Weymouth
ATTORNEYS

Jan. 15, 1952     C. J. THATCHER     2,582,297
AIR CONDITIONING UNIT AND EXPANSION MOTOR THEREFOR

Filed April 10, 1945     5 Sheets-Sheet 3

INVENTOR
CHARLES J. THATCHER
BY
ATTORNEYS

Jan. 15, 1952   C. J. THATCHER   2,582,297
AIR CONDITIONING UNIT AND EXPANSION MOTOR THEREFOR
Filed April 10, 1945                                    5 Sheets-Sheet 4

INVENTOR
CHARLES J. THATCHER
BY
Bartlett, Eyre, Keel & Weymouth
ATTORNEYS

Jan. 15, 1952  C. J. THATCHER  2,582,297
AIR CONDITIONING UNIT AND EXPANSION MOTOR THEREFOR
Filed April 10, 1945  5 Sheets-Sheet 5

INVENTOR
CHARLES J. THATCHER
BY
ATTORNEYS

Patented Jan. 15, 1952

2,582,297

UNITED STATES PATENT OFFICE 2,582,297

AIR CONDITIONING UNIT AND EXPANSION MOTOR THEREFOR

Charles J. Thatcher, New York, N. Y.

Application April 10, 1945, Serial No. 587,558

10 Claims. (Cl. 257—8)

This invention relates to rotary motors or engines adapted for the expansion of air, gas or vapors, and especially for use in refrigeration or air conditioning.

A particular object of the invention is to provide a coupled rotary expansion and compression unit for such purposes, one which will avoid contact of the impellers with one another or with the cylinders, to the end that lubrication, as with oil, may be rendered unnecessary, but so designed nevertheless that the unit shall be substantially free of internal friction.

A further object of the invention is to provide a unit having moving parts so weighted and proportioned as to maintain static and dynamic balance thereof, thus to promote vibrationless and noiseless actuation of the unit.

Another object is to provide a multi-cylindered unit of the specified nature and thereby to promote smooth operation of the motor.

It is also an object of the invention to provide, in a fluid expansion motor, a valved inlet port of relatively large cross-section as compared to the cross-sectional area of the high pressure chamber, in order that drop in pressure due to friction of the fluid flow through the intake may be minimized.

A further object is to provide a compact unit of simple and rugged design which can operate long periods of time without maintenance, adjustment or undue wear.

Another object of the invention is to make it possible to dispense with the use of electric current and electric motors as a source of power, in self-contained air conditioning or cooler units, by substituting compressed air and an air expansion motor such as that of this invention to drive the other moving elements of a unit.

Other objects of the invention will appear as the invention is hereafter described.

There is a general and considerable need for a small sized, compact and efficient rotary compressor, and for a rotary motor adapted to be actuated by the expansion under a load of compressed air or vapors—i. e. a unit so designed as to give maximum refrigeration and durability and to require a minimum of attendance, maintenance and adjustment. The requirements of the service preclude ordinary lubrication as by oil—which would impair the performance of the unit especially during use involving non-recycling of the refrigerant.

Experience has demonstrated the desirability of an absolute minimum of internal friction in the unit; of a careful balancing of its rotating elements so as to avoid vibration, noise and wear; and of the need of a relatively large inlet port and cut-off valve for the flow of compressed fluid. The elements of the unit should, furthermore, be rugged and compact, few in number, light in weight, easily assembled, and not subject to corrosion or wear from the flow through the unit of the actuating fluid.

The unit of the present invention exhibits these desirable characteristics. It can be advantageously employed in the air conditioning systems of my prior patents, Reissue No. 21,203 dated September 5, 1939 and No. 2,244,319 dated June 3, 1941 and will be described with reference to such systems.

The motor of this invention was designed, moreover, to improve upon the design of the motor of the latter patent and for similar usages, namely, for the conditioning of rooms by the expansion of compressed air conducted through pipes, for example through the pipes of steam heating systems, from a distant point. The herein disclosed unit is generally superior, however, for those industrial uses requiring refrigeration at sub-zero temperatures, particularly in factories having air compressors and conduits already installed; this unit has also superior characteristics for the production of very low temperatures generally or of extremely dry air.

The new unit as well as the new elements thereof can thus be employed wherever refrigeration, or the dehumidification of air is desired.

For an understanding of the invention, reference may be had to the accompanying drawings illustrating one embodiment thereof, which in full size may be 22" high and 9" by 5.5" in cross-section. Of the drawings—

Figure 1:
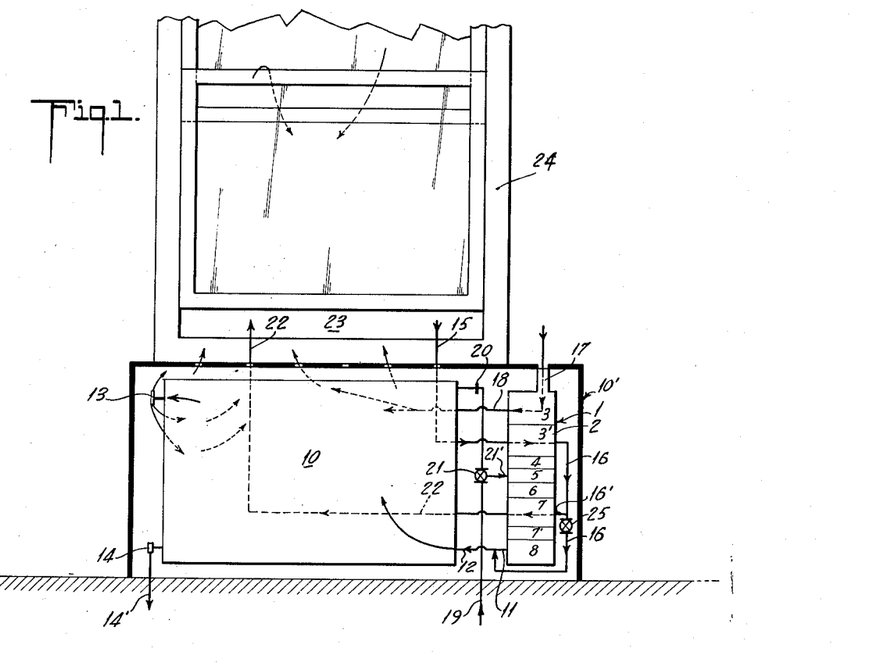
Fig. 1 is a diagrammatic view showing an air conditioning unit embodying the invention and connections therefrom to a radiator (shown in cross-section) and window adapter.
Figure 2:
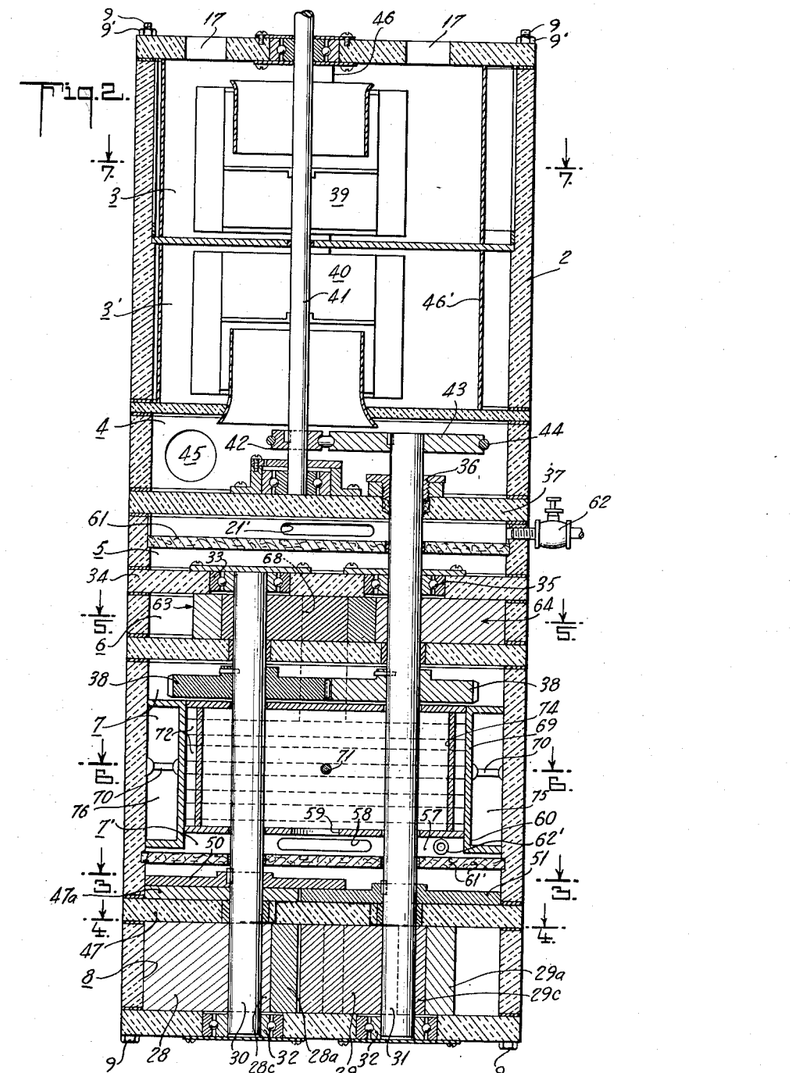
Fig. 2 is a vertical sectional view, through the unit 1 of Fig. 1.

The unit 1 embodying the invention is shown diagrammatically in Fig. 1, and in detail in Fig. 2, as comprising a casing 2 enclosing eight chambers or compartments 3, 3', 4, 5, 6, 7, 7' and 8 with intervening cover plates and gaskets, all arranged so that the unit can readily be assembled and all its parts clamped together airtight by bolts 9 and nuts 9', one at each corner of the unit. Excepting its ball-bearings it is constructed of metal (e. g. die-castings), or of plastic sheets, rods or tubes, and molded parts, all of which need little or no machining. As indicated in Fig. 2, chambers 3 and 3' contain blowers 39 and 40; chamber 4 contains bearings, pulleys and a stuffing box, chamber 5 an air inlet port 21' and a filter 61; chamber 6 contains a compressor or booster; chamber 7 contains a heat exchanger; chamber 7' an alternative air inlet port 58, filter 61' and motor cut-off valves 50 and 51; and chamber 8 contains the expansion motor, which is the prime mover and furnishes all required power.

Figure 4:
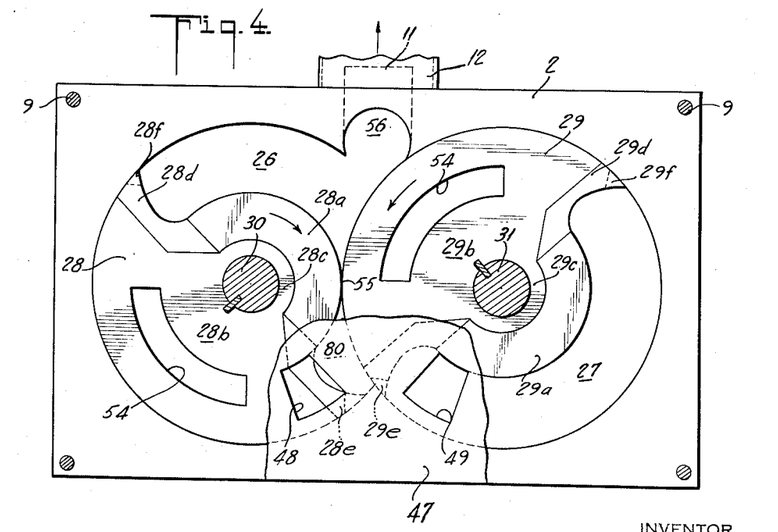
Fig. 4 is a horizontal sectional view taken on the line 4—4 of Fig. 2 showing the rotating members of the expansion motor and a broken-away section of its cover plate.

In the embodiment of the invention illustrated in Fig. 1, the unit 1 is positioned adjacent a radiator 10 for delivery of cooled, dehumidified air thereto, as through a channel 12 connecting it to the normally closed lower end of the radiator. The air delivered to the radiator through channel 12 is a mixture, at or below its dew point of say 55° F.; one constituent of the mixture is cold dry air at a temperature of 75° F. below zero, more or less, flowing from the port 11 of the expansion motor in chamber 8 of unit 1; its other constituent is fresh, moist air at say 90° F. drawn in from outside the room through conduit 15 by the blower in chamber 3' of the unit and delivered by a pipe 16 to channel 12 surrounding port 11 (Fig. 4).

The mixture of chilled dried air and warm moist air thus delivered to the radiator passes through the interior thereof and escapes from the normally unused upper end 13 of the radiator into the upper levels of the radiator enclosure 10'. Any water condensed from the air while within the radiator tubes drains off through the open Sylphon valve 14 of the radiator. The cooled, partially dehumidified air (saturated at say 55° F.) issuing from the outlet 13 of the radiator mixes around the upper portions of the radiator with room air at say 80° F. recirculated by the blower in chamber 3 of the unit. This blower draws room air into the chamber 3 through openings 17 in casings 10' and 2, and delivers the air through a pipe 18 terminating back of the radiator 10.

It will be noted that the radiator does not function as a convector in warm weather, but rather as a trap for condensed moisture. It is also a singularly effective muffler for the intermittent exhaust from the expansion motor.

The air stream flowing from the radiator, as at exit 13, will be 55° F. wet and dry bulb as it will be saturated with moisture. Since its dew point is 55° F., it will only be 50 per cent. saturated when heated to 75° F. dry bulb; it will attain approximately that latter temperature when it is mixed near the top and exteriorly of the radiator with a current of warmer recirculated room air of a much greater volume, say 400 cubic feet per minute. The temperature of this recirculated room air will be 80° F., dry bulb, soon after the start of the operation of the system, if the outdoor air temperature is 90° F. D. B. Since all of the fresh air input is cooled to 55° and dehumidified down to saturation at 55°, the air in the room speedily attains a wet bulb temperature of about 68° F. and consequently a humidity of 50 per cent. The combined current of recirculated room air and of cooler, dehumidified fresh air flows upwardly into the room through the openings in the radiator enclosure as illustrated by the arrows in the drawing on Fig. 1. Summer comfort conditions are thus established and maintained.

Figure 5:
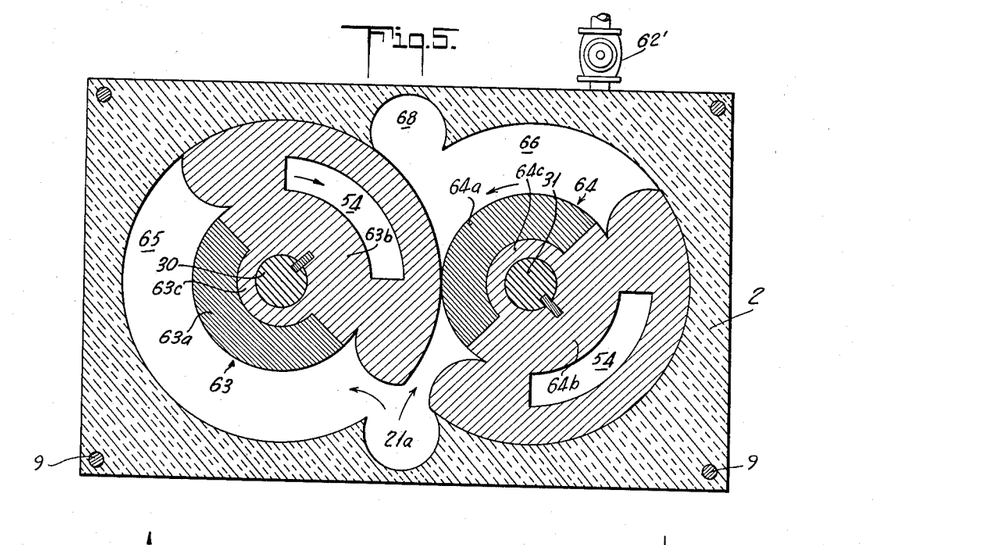
Fig. 5 is a horizontal sectional view taken on the line 5—5 of Fig. 2 showing the rotating elements of the booster or compressor.

The steampipe 19 which, when the air conditioning system is in use, contains air compressed and dehumidified at a remote point, as for example adjacent the power plant of the building as described in Patent No. 2,244,319, is shut off by the usual modulator valve 20 from the radiator 10 and is connected through a valved pipe connection 21 (Fig. 1) to the inlet 21' and after passing through filter 61 flows to the compression-booster motor in compartment 6 (see Figs. 2 and 5). The air delivered at increased pressure by the compressor-booster in compartment 6, has its heat of compression removed by passage through the cooler or heat exchanger in compartment 7 and is then introduced into chamber 7' for intermittent admission to the expansion motor in chamber 8. Most of the fresh air drawn in through conduit 15 by the blower in compartment 3' is used for this extraction (in compartment 7) of heat from the pressure boosted compressed air. After transference of heat to this cooling fresh air stream the heated air stream flows from the room through a conduit 22. Conduits 15 and 22 terminate in suitable openings in an adapter 23 fitted beneath the lower frame of the window 24.

The construction of the various elements within the unit 1 will now be described with reference to Figs. 2 to 7 inclusive.

As shown best in Fig. 4, the expansion motor in the interior of compartment 8 comprises two overlapping cylindrical chambers 26 and 27 within which are mounted intermembered impellers 28 and 29 keyed respectively to vertical shafts 30 and 31. These shafts (see Fig. 2) may be metal or plastic rods or tubes. They are mounted in ball bearings 32 in the lower end of the casing 2 and extend upwardly through the various compartments, shaft 30 terminating in ball bearings 33 mounted in partition 34 separating compartments 5 and 6; and shaft 31 passes through ball bearings 35 in partition 34, through stuffing box 36 in partition 37 separating compartments 4 and 5, and terminates within compartment 4. The only lubrication needed by the unit will be a drop of oil in the ball bearings of the shaft at infrequent intervals. Since the bearings are out of contact therewith there can be no contamination of the air, gas or vapor streams by oil vapor.

Shafts 30 and 31 are coupled together by gears 38 in compartment 7 so as to rotate at equal speeds and in opposite directions. Blower 39 in compartment 3 and blower 40 in compartment 3' are both mounted on a shaft 41 for rotation thereby. Shaft 41, which is mounted at its lower end in ball bearings mounted on partition 37 and extends through a ball bearing in the upper wall of casing 2, is driven from shaft 31 in any suitable manner, as for example, by means of pulleys 42 and 43 keyed respectively to shafts 41 and 31 and coupled as by the belt 44. As shown, pulley 42 is smaller than pulley 43 so that the blowers may be rotated at a substantially higher speed, if desired, than that of the shafts 30 and 31.

Blower 39, as described in connection with Fig. 1, draws in room air through the openings 17 (Fig. 2) and delivers the same through outlet port 46 (Figs. 2 and 7) to the pipe 18 for mixture with dehumidified cooled air issuing from the radiator 10. Blower 40 draws in fresh air through the conduit 15 (Fig. 1) and inlet 45 (Fig. 2) in compartment 4 and delivers it through outlet port 46' (Fig. 2), in major part to the cooler through conduits 16 (Fig. 1) and 16' and its smaller portion to the conduit 12 through which it enters the radiator after mixture with chilled expanded air.

Blowers 39 and 40 may be of the squirrel cage type although others, if sufficiently compact, can be used. The lower blower 40 in compartment 3' is used to aspirate fresh air from the atmosphere external to the building through a hole in the adapter 23 at the right of the window. This air serves principally to expel from the room the heat of compression of the primary air stream passing through the cooler or heat exchanger in compartment 7; part of the fresh air serves to ventilate the room, after the temperature and humidity of this portion of the fresh air stream has been suitably lowered by mixture with the sub-zero expanded air issuing from the motor as previously described.

The top blower 39 is used to recirculate room air drawn in through the openings 17 (Figs. 1 and 2) and forced by the blower through the conduit 18 back of the radiator near its top, where it mixes with the conditioned air flowing through the radiator and from its outlet 13, in a direction adjacent to the top of the radiator, as shown by the arrows flowing from exit 13 of radiator 10. It is desirable to keep the flow of recirculated room air, before and after its admixture with the conditioned air, near the top of the radiator so as to prevent the radiator itself from being heated much above the temperature of the conditioned air stream flowing through the radiator. If this occurs it would thereby increase the temperature of the air stream through the radiator and thereby impair the efficiency of dehumidification.

Figure 3:
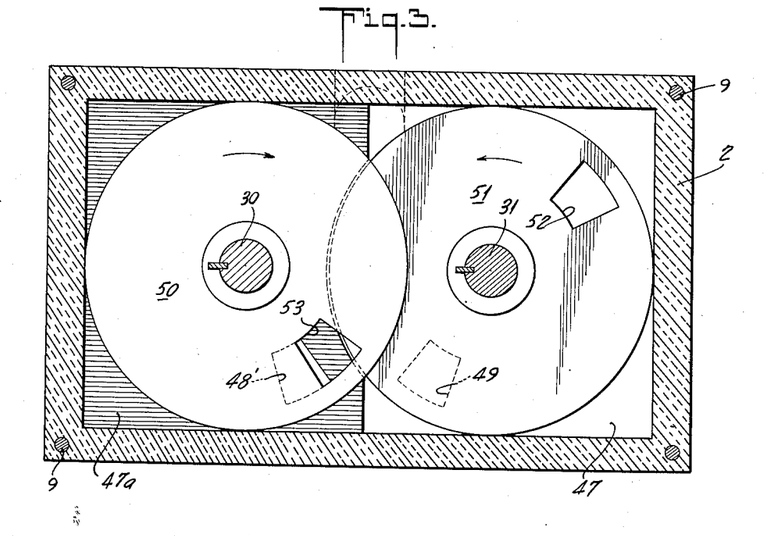
Fig. 3 is a horizontal sectional view taken on the line 3—3 of Fig. 2 showing the cut-off valves for the expansion motor.

The air intake ports, and the valves controlling the same, of the expansion motor will now be described with reference to Figs. 2, 3 and 4. A cover plate 47 (Fig. 2) above the motor parts is provided with two incised openings 48 and 49 therein; these serve as inlet ports for the air motors. Keyed to the shafts 30 and 31 are valve disks 50 and 51 which partially overlap (Fig. 3). Disk 51, the lower side of which is in close proximity (say .0001 inch) to cover plate 47, has an incised opening 52 therein adapted to register once during each revolution with the opening 49 in cover 47. Valve disk 50 is spaced from cover 47 a distance equal to the thickness of disk 51, a filler plate 47a being sandwiched between cover 47 and disk 50. Filler plate 47a is provided with a suitably positioned opening 48' alined with and shaped like opening 48. A like opening 53 in disk 50 registers once in its revolution with the inlet ports 48 and 48' in plates 47 and 47a. Thus the valve disks 50 and 51, during their rotation, alternately open and close the ports 48 and 49 to the expansion motor, now to be more fully described with reference to Figs. 2 and 4.

The impellers 28 and 29 which are of identical design, have semi-cylindrical portions 28a and 29a each of a radius substantially half that of the cylindrical chambers 26 and 27; they have, also, other substantially semi-cylindrical portions 28b and 29b of a radius such as to just clear the cylindrical walls of the chambers. The portions 28b and 29b could be of any light metal such as aluminum or of light weight alloy, but are preferably molded of a suitable plastic material so as to reduce the weight thereof sufficiently to nearly equal that of the portions 28a and 29a. The portions 28a and 29a may be of steel or of some heavy alloy and should be so weighted and proportioned as to provide static and dynamic balance of the impellers. An arcuate or other suitably shaped and sized cutout 54 is provided in each portion 28b and 29b to insure exact balancing of the impellers. In order to prevent convection of heat, if shafts 30 and 31 are made of metal, sleeves 28c and 29c of thermally non-conducting material should be provided; or, when portions 28b and 29b are of plastic material, these portions can be extended to encircle the respective shafts. Alternatively, these shafts may themselves be, or be enclosed, in thermal non-conducting material.

Attached to each of the two impellers are two facing members 28d, 28e and 29d, 29e for the vertical side surfaces of portions 28b and 29b. The purpose of these facings is to provide a more durable surface at that portion of the impeller where, under unusual conditions, minute snow-like particles of ice may be shaved from the cylinder or from the other impeller by the cutting edge 28f and 29e of each facing. The shape of each facing is arcuate so as to impel any such snow particles forward before the rotating impeller and to sweep them into the outlet 56 and in the rear wall of the unit. Such snow particles float in the high velocity air stream and immediately melt upon the merging at the juncture of port 11 and conduit 12 (Fig. 4) of the cooled air from the motor with the warm fresh air aspirated by blower 40. The motor outlet 11 being constantly bathed by a surrounding warm air stream in conduit 12 is kept warm. Ice formation at the motor outlet is thus effectively prevented.

As viewed in Fig. 4, impeller 28 and its shaft 30 revolve clockwise and impeller 29 and its shaft 31 revolve counter-clockwise. Some portions of their peripheries are always nearly in contact, as at the point 55 in Fig. 4. The curved surfaces of the two facings of each impeller are also so shaped as to insure near contact as they sweep past each other twice during each revolution. A clearance of say a few thousandths of an inch is provided, which may increase by contraction caused by cooling shortly after the operation of the unit is instituted. Since the compressed air, although it has been dehumidified at its source, nevertheless carries a trace of moisture, a very thin film of ice will form on all interior surfaces of the motor, which film will increase in thickness only until clearances are closed. Thereafter the slightest contact and sliding friction between the two iced surfaces will cause sufficient melting to reestablish a minute clearance. Such automatic adjustment of ice-film thickness may occasionally be supplemented by the cutting edges 28f and 29f of the facings. These conditions obviate the necessity for any oil lubrication of the impellers. Friction in the unit 1 is confined to the ball bearings of the shafts.

Compressed air from pipe 19 (Fig. 1) is introduced into the compartment 5 (Fig. 2) above the filter plate 61 through an opening 21' in the wall of the casing 2. After filtration to remove rust, pipe-scale, etc. the air flows into the compressor in compartment 6, where its air pressure is boosted; it is then cooled in compartment 7 in the heat exchanger of Fig. 6 and the cooled high pressure stream enters chamber 7' through a central opening 59 in the wall 60 between compartments 7 and 7'. The stream of cooled, high pressure air then passes through the cut-off valves and ports 48 and 49 and is thereby intermittently introduced into the motor.

In the position of the parts illustrated in Figs. 3 and 4, air under the higher pressure is just beginning to be admitted into the pocket 80 through ports 53, 48' and 48. If those openings are each about 30° in width, air will be admitted through approximately 60°, or about one-third of the 180° expansion arc—if the air expansion is in a three-to-one ratio of entrance to exit pressures. That is, the continued rotation of the valve disk 50 cuts off the air flow after about 60° of its travel; the air, being then at say three atmospheres, will expand to approximately atmospheric pressure during the balance of the total expansion travel of 180° of impeller 28.

During expansion, a pressure of three atmospheres, initially, is exerted on facing 28e but only one atmosphere on facing 28d; the resulting torque creates power which is translated by shaft 30 to shaft 31, through the gears 38 (Fig. 2). Shaft 31 thus maintains the revolution of the other impeller 29 during its coincident 180° scavenging arc of rotation, which causes the expulsion of chilled air expanded during its preceding 180° expansion arc of rotation. Each alternate expansion of the two impellers also translates power through the shafts 30 and 31 to the impellers of the booster compressor in compartment 6, and through shaft 31 and shaft 41 coupled thereto to the blowers 39 and 40.

Although each such expansion is only during 180° of revolution of each impeller, it is immediately followed by a similar expansion during rotation of the other impeller; and, because of their interconnection through gears 38, torque is exerted almost constantly on all three shafts and the impellers or the blowers keyed thereto. Since the impellers are all balanced, as previously explained, quiet and vibrationless rotation of the unit results. The combined thrusts during any arc of rotation are taken up by the ball bearings at the extremities of each shaft.

The filter 61 (Fig. 2) is provided in order effectually to prevent entrance of scale or rust from the steam or other supply pipe into the booster-compressor. A blow-off cock 62 permits removal of any accumulated scale or rust from the surface of the filter, it being only necessary to open the cock 21 and thus allow air under pressure to flow through the inlet 21' over the top surface of filter 61 and out of the open cock 62. Since the air stream is filtered before compression in the basement, there can be no considerable accumulation of rust or scale after the first few hours of operation, which will sweep out all such particles in the steam pipes.

The booster-compressor, as shown in Figs. 2 and 5, comprises the impellers 63 and 64 keyed respectively to shafts 30 and 31 and rotating in overlapping cylindrical chambers 65 and 66. The impellers 63 and 64 are preferably keyed to their shafts out of phase with the attachments of impellers 28 and 29 of the motor, so as to balance the torque on the shaft; they are similar in shape to impellers 28 and 29 and could be identical therewith. Impellers 63 and 64 include the semi-cylindrical portions 63a and 64a of steel or another heavy material, heat insulated from the shafts 30 and 31 as by plastic collars 63c and 64c merging with the larger cylindrical portions 63b and 64b of plastic material. As in impellers 28 and 29, suitable cut-outs 54 are formed in portions 63b and 64b to insure static and dynamic balance.

Compressed air entering chamber 5 through inlet 21' is delivered to the impellers 63 and 64 through a vertical channel, indicated at 21a in Fig. 5, which extends through the partition 34. The compressed air from the booster-compressor exits through a second channel 68 which terminates within the heat exchanger in chamber 7, where it is stored and cooled by exchange of heat with the air delivered from blower 40 through inlet 16' (Figs. 1 and 6) to the cooler. Any compact type of heat exchanger, such for example as those employed in domestic refrigerators, could be used for the cooler of the present unit.

Figure 6:
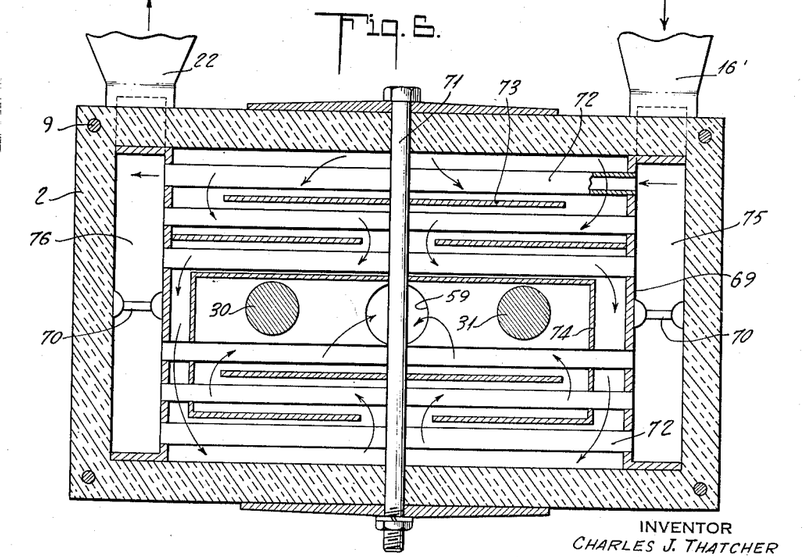
Fig. 6 is a horizontal sectional view of the cooler or heat exchanger of the unit taken on the line 6—6 of Fig. 2.
Figure 7:
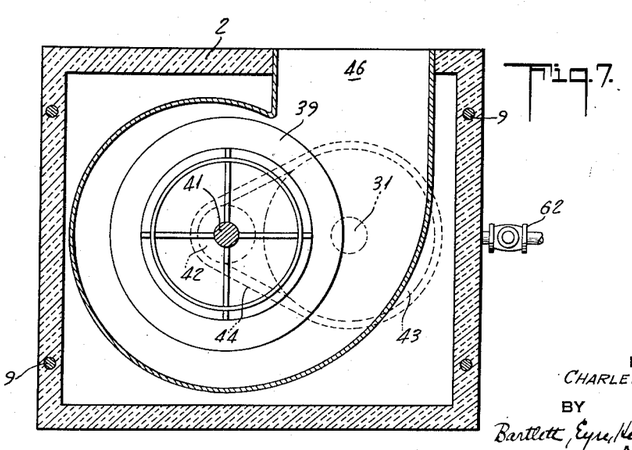
Fig. 7 is a horizontal sectional view, on a smaller scale than Figs. 3 to 6, through the upper blower taken on line 7—7 of Fig. 2.

For purposes of illustration, a suitable design of cooler is shown in Figs. 2 and 6. As shown, it comprises a series of 24 horizontally arranged metal tubes 72 extending from an inlet header 75 to an outlet header 76 through which passes the cooling air from blower 40. Around the exteriors of the tubes 72 and a series of baffle plates 73 the warm compressed air from the booster-compressor flows in the tortuous path indicated by the arrows in Fig. 6. The air, after thus being cooled by transference of its heat to the fresh air stream, enters chamber 7' through an aperture 59 in the lower wall of the cooler, and from chamber 7' is fed into the expansion motor, as heretofore described, through the valve disks 50 and 51. Since there may be internal air pressure of 60 pounds gauge or even more on each square inch of the interior of the cooler, it is desirable to strengthen the box—which may be of plastic—by inserting through its central line the tie rod 71, which is tightened by nuts as shown and which presses against exterior plates along the length of the cooler as shown in Fig. 6. It is also desirable to place a supporting stud such as 70 at each end of the cooler box as shown in the drawing.

At each revolution of shafts 30 and 31 the impellers 63 and 64 of the compressor will deliver into the cooler a volume of pressure-boosted compressed air equal to the difference in volume of cylinders 65 and 66 and the impellers themselves. Each impeller contributes one-half of this total volume of compressed air moving through the booster during each cycle of revolution of the impellers. In a unit of the size previously indicated, that volume would amount to about 11 cubic inches. Since the expansion motor is double the depth of the booster compressor in the design illustrated in the drawings, and is otherwise the same in dimensions, the expansion motor will have double the volume of the booster, i. e. 22 cubic inches. That relationship is arbitrary and is based upon an assumption that only 50 per cent. of the energy of expansion will be available for driving the impellers of the booster compressor.

However, the only detraction from the attainment of 100 per cent. utilization of the energy of expansion is that caused by internal friction which in this design is reduced to a minimum as heretofore explained; it should not exceed 10 or 15 per cent. at the most. Consequently, the booster compressor could have a volume 85 to 90 per cent. of that of the expansion motor. The pressures built up by the booster compressor depend upon the initial pressure of the entering compressed air stream from the steampipe 19 and the relative total size of the booster to the effective size of the expansion motor as determined by the action of the cut off valves.

In order to attain complete expansion from say three or four atmospheres down to one atmosphere after expansion, the size of the inlet ports of the motor is adjusted to the final pressure of the compressed air stream as it leaves the cooler and flows into the ports of the expansion motor. This size and air pressure are to be determined by the conditions of the building, i. e. its size, exposure and other conditions which vary according to the local conditions. A deviation from the standardized air pressure initially determined would cause only a minor reduction in the efficiency of the system. If at any time it was desired to permanently change the operating compressed air pressure, it is done by substituting another set of valve disks 50 and 51 with different sized ports 52 and 53. Ordinarily an air pressure of two or three atmospheres, that is 30 or 45 pound absolute in the steam supply line, and a pressure of three to five atmospheres in the stream flowing from the booster compressor is advisable.

With a properly designed exterior casing 2 and suitable gaskets there can be no leakage of compressed air from the interior of the unit to the ambient atmosphere. It should be tight, at least from the partition 37 to the bottom of the box shown in Fig. 2. The only place where internal leaks could occur would be between the contact of the impellers 63 and 64 of the booster compressor (Fig. 5). However, by the interposition of a check valve (not shown) at the entrance to that booster compressor, for example in the inlet 21', and a similar check valve at the outlet from the booster compressor, for example below the outlet port of channel 68, leakage of the pressure boosted air could only occur backwards to the initial pressure air, within the compressor itself, particularly through the contact between the two impellers. Such leakage, however, is quickly compensated by consequent decreased flow of the compressed air from supply pipe 19 into the inlet port 21'. Consequently, it is not necessary to have an airtight contact between the impellers or between the impellers and the walls of the cylinders 65 and 66. A clearance of a few thousandths of an inch will avoid the necessity of lubrication; and any leakage which can occur through such a gap of a few thousandths of an inch between rotors traveling in a direction opposed to a leakage flow can have little or no effect upon the efficiency of the booster compressor.

The temperature and humidity of the air stream flowing into the room from the grill of the radiator enclosure is regulated by hand, or automatically by thermostatic control of the two valves 21 and 25 shown in Fig. 1. The ratio of volumes of the cold and warm air streams and the absolute volume of each will control temperature and humidity, not only of the air issuing from the radiator grill but also of the air in the room after the system has been in operation for a brief period of time.

In order to initiate operation of the unit it is ordinarily only necessary to open the valve 21 in the supply line 19 so as to deliver air under pressure to the booster compressor. As the initial pressure in compartments 7 and 7' is that of the atmosphere, the rush of compressed air through inlet 21' causes rotation of impellers 63 and 64 and consequent preliminary operation of the compressor as a motor. During this first stage the compressor thus furnishes the driving power to the unit. Thereafter, when the pressure becomes sufficiently high in the cooler, the driving power is furnished by the expansion motor as heretofore described. If by any chance the unit should not start promptly upon the delivery of compressed air to the compressor, due for example to the particular position of the impellers, operation may be readily initiated by forced rotation of the shaft 41. This shaft, as shown in Fig. 2 extends through the upper cover of casing 2 and could, and preferably would, be provided with a wheel or crank for manual rotation when desired. Such a wheel could act also as a fly wheel for improving the operation of the unit.

Figure 8:
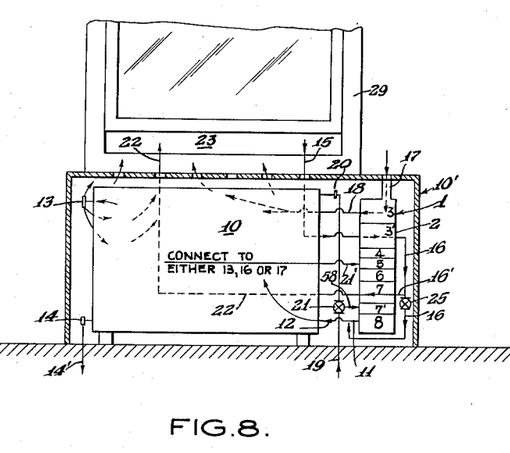
Fig. 8 illustrates another form of the invention.

The foregoing description has been confined solely to the operation of the system for pressure boosting, that is, for increasing the pressure of the incoming air stream and its pressure as it enters the expansion motor. Alternatively, without change in the apparatus, the energy of expansion of the compressed air in the motor can be utilized to increase the volume rather than pressure of the air flowing through the inlet ports of the expansion motor. This is accomplished by connecting the compressed air supply line 19 to an inlet 58 (otherwise closed) into the unit (see Figs. 2 and 8) instead of the inlet 21' of the unit as previously described. The compressed air from the basement delivered through the supply line would then flow directly into the compartment 7' instead of into compartment 5 as previously described. Consequently, a filter plate 61' and blow off cock 62' may be provided in chamber 7' of the unit, in addition to the filter plate 61 and cock 62 of chamber 5.

In this arrangement the booster compressor draws in either outside fresh air or room air— but preferably conditioned air—through the inlet opening 21' of compartment 5, which air can be filtered by filter plate 61. It will be preferable to connect inlet 21' of the booster compressor, in this alternative procedure, to one branch of the outlet 13 of the radiator and thus incorporate a portion of the partially dehumidified air into the main compressed air stream, after such air had been boosted to the pressure of the main air stream. This volume of boosted compressed air has its heat of compression removed, as before, in the cooler, from which it joins with the main air stream after flowing through the opening 59. Of course, instead of using partially dehumidified air from outlet 13, the inlet 21' of the booster compressor could be connected to the fresh air header 16 or it could aspirate room air through an opening 17 in the enclosure casing of the radiator.

The novel expansion motor of this invention can usefully be coupled to any load, other than that heretofore described, which can advantageously use the energy of air expansion of the cold air motor. One such alternative load is afforded by the substitution of air expansion motors for the electric motors now universally used to drive air cooling and dehumidifying elements of unit room coolers or air conditioners, hereafter termed room coolers. Decided advantages result from such substitution.

Widespread use of portable room coolers has been prevented by the fact that only a very limited number thereof can be powered from the electric wiring normally installed in buildings, without overloading the circuit, causing short-circuiting or blowing of fuses. Buildings designed and erected primarily for human occupancy are rarely wired for electrically powered devices having considerable current demand. 15 ampere fuses are usual in such lines, which are sufficient for the current used in lighting fixtures, small electric fans, radio, domestic utensils, etc. But where more than one or two motors of one-half to one horsepower—or three and one-half to seven amperes at 110 volts—are imposed on a normal load of 10 amperes, more or less, needed to supply other human requirements, the circuits thereby become overloaded. Only rewiring of an entire building, consequently, would permit general use of unit room coolers throughout the building.

Each electric motor in a room cooler adds, furthermore, to the heat load in any room in which it is used and thereby adds to the cost of current in air conditioning. For this reason alone, substitution of a prime mover which cools rather than heats room air is very desirable. This is particularly so if the actuating energy can be conveyed to each room from a central point by means—other than electric cables and wires—already installed in a building. Compressed air conveyed through steam supply lines of heating systems and air expansion motors, e. g. those of this invention, offer a convenient and low cost source of power for multiple unit room coolers.

Figure 9:
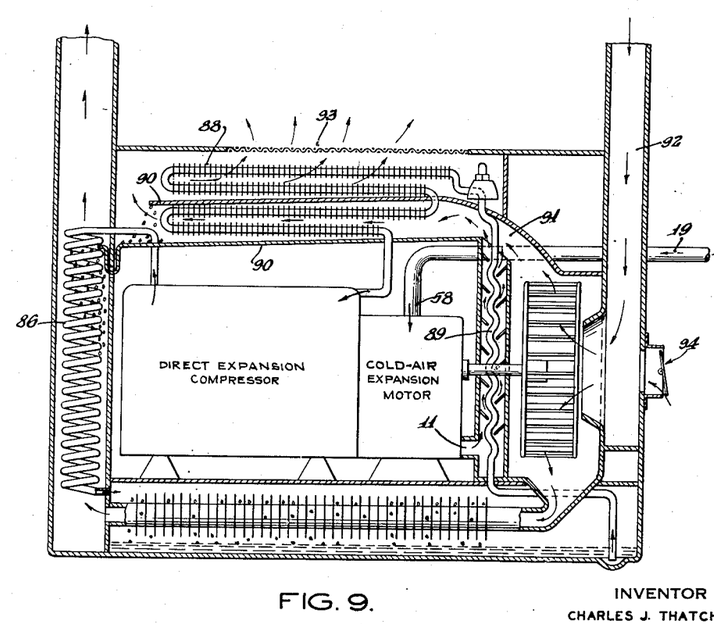
Fig. 9 is a sectional view of a further embodiment in accordance with the invention.

No change in the design of the room cooler other than the substitution of a cold-air expansion machine for an electric motor is needed. The motors will be of about equal size for equal power; they can be designed for the same speed and can have equally low noise levels during operation. Only the elements of the expansion motor shown in Figs. 3 and 4, assembled as shown in compartments 7' and 8 of Fig. 2 are needed. The steam-compressed-air supply line 19 of Fig. 1 is connected to the inlet 58 of the expansion motor of the cold air cycle (Figs. 2 and 9) in compartment 7' through a suitable valve 2. The balance of the unit heretofore described is dispensed with and all the elements—other than the electric motor—of the usual self-contained room cooler are substituted. The outlet port 11 of the cold-air motor can be connected to the inlet of the adjacent steam radiator by conduit 12 in order to take advantage of the convenient function of a radiator as a sound muffler and condensate trap—all as heretofore described. The radiator outlet 13 will then be connected, as by a conduit or a pipe, to the air discharge of the room cooler. Optionally, the outlet 11 of the motor can be connected, either directly or (as shown in Fig. 9) through a small sound muffler and Freon liquid sub-cooler 89, to the air discharge of the room cooler. The drip pan 90 found in some self-contained room coolers can also be connected to the line for condensate from the radiator, either above or below the Sylphon valve 14 of Fig. 1. Any condensate drip from the cooling coil 88 of the room cooler can thus be drained off to the basement; or the usual disposal of condensate by evaporation on the hot condenser coil 86 can be retained.

The expanded air from the motor 91 mingles with the fresh air stream 92 or room air 94 flowing to the cooling coils and the conditioned air mixture flows, as usual, into the room through the air discharge grill 93 of the room cooler.

The advantages of this novel arrangement are evident; for in addition to those already named a higher cooling and dehumidifying capacity per unit of space and cost is achieved. Air expansion motors of the design here disclosed will be cheaper in mass production than electric motors of equal size. Like electrically driven motors, the inlet of the air motor can be removably connected—to the steam pipe—for complete removal of the unit from the room during cold seasons of the year.

The invention has now been described with reference to one specific embodiment thereof. Obviously, the invention in its broadest aspect is not limited to the particular details of construction illustrated in the drawings nor to the particular air conditioning system described, as various changes, omissions or substitutions might be made both in the construction of the unit and in the operation of the system without departing from the spirit of the invention as defined in the appended claims.

I claim:

1. A compression-expansion unit adapted for refrigeration by air expansion comprising in combination a rotary expansion motor, a load for the motor comprising a compressor coupled thereto, said motor and compressor each including cooperating rotary impellers mounted in intersecting cylindrical chambers, each of said impellers having one pocket therein spanning an arc of substantially 180 degrees, means for supplying air to said compressor to increase the air pressure therein, means for reducing the heat of compression of the air delivered from the compressor, and means delivering air under pressure intermittently to said motor to drive the unit and chill the air by expansion therein.

2. The unit according to claim 1 wherein the coupling between said motor and compressor is such that the pockets of the motor impellers are out of phase with those of the compressor impellers to balance the intermittent drive of the motor impellers.

3. The unit according to claim 1 wherein the coupling of said motor and compressor comprises a pair of parallel shafts to each of which one impeller of the motor and one impeller of the compressor are keyed, and gears coupling said shafts together for rotation in opposite directions, the impellers of said compressor being keyed to said shafts with their pockets out of phase with the pockets of said motor impellers.

4. The unit according to claim 1 wherein said means for intermittently delivering air comprises a pair of inlet ports each port communicating separately with an end of one of the motor chambers and valve means rotatively secured to said motor impellers arranged for alternate opening and closing of each of said inlet ports during the first half of the rotation of the associated impellers.

5. In an air conditioning system, the combination comprising a compressed air supply pipe, a compartmented casing housing an expansion motor, a booster compressor, a heat exchanger and air circulating means, said booster compressor being connected to receive air from said pipe and to deliver the same at higher pressure to said heat exchanger for cooling and storage therein, a pair of shafts within said casing for driving said air circulating means and said booster compressor from said motor, said motor and compressor each including rotary intermembered pocketed impellers, a radiator adjacent said casing and serving as a sound muffler and moisture trap for air expanded by said motor, said air circulating means being connected to deliver a cooling fresh air stream to said heat exchanger for reducing the temperature of air compressed by said booster compressor and said expansion motor being connected to receive the so cooled compressed air stored in said exchanger, and rotary cut-off valves on said shafts for intermittently interrupting the flow of air from said exchanger to said motor.

6. The combination according to claim 5 wherein said air circulating means comprises a pair of blowers, one of said blowers drawing in room air and delivering it above the radiator to merge with the air stream issuing therefrom, and the other of said blowers drawing in outside air and delivering it in part to the heat exchanger and in part to the radiator for mixture with the air expanded by said motor.

7. The combination according to claim 5 wherein said rotary cut-off valve comprises a pair of disks each having an incised opening therein adapted during the first half of each impeller revolution to uncover and close a port communicating with a pocket of an impeller, said disks being oriented on said shafts so as to alternately uncover the ports to each impeller pocket.

8. The combination with a pipe of a steam heating system adapted to carry compressed air, of a self-contained air driven room cooling unit comprising a cold-air expansion engine connected to said pipe and arranged to exhaust its cold air into the room, said engine comprising a pair of intersecting cylinders and cooperating pocketed impellers mounted therein on a pair of shafts geared together for rotation in unison, and a load driven by said shafts comprising a direct expansion air conditioning device adapted to supplement the room cooling effect of said cold-air exhaust whereby the combined effect of said air conditioning device and the cold air exhaust results in a materially improved operating efficiency.

9. A compression expansion device for refrigeration by air expansion, comprising a rotary expansion motor, a load for the motor comprising an air compressor coupled thereto, said motor and compressor each including cooperating rotary impellers mounted in intersecting cylindrical chambers, a channel for flow of compressed air from the compressor to the motor, a heat exchanger for removing the heat of compression during said air flow, shafts extending axially through said chambers and channel each coupling a motor impeller to a compressor impeller, gears coupling said shafts together, air inlet ports incised in the end walls of said motor chambers to connect the said channel to said motor chambers, and rotary overlapping valve discs facing the outer side of each end wall, each secured to a shaft and arranged to alternately open and close the respective air inlets.

10. A compression expansion device for refrigeration by air expansion, comprising a rotary expansion motor, a load for the motor comprising a compressor coupled thereto, said motor and compressor each including cooperating rotary impellers mounted in intersecting cylindrical chambers, a channel for flow of compressed air from the compressor to the motor, a heat exchanger for removing the heat of compression during said air flow, shafts extending axially through said chambers and channel each coupling a motor impeller to a compressor impeller, gears coupling said shafts together, air inlet ports incised in the end walls of said motor chamber to connect the said channel to said motor chambers, rotary overlapping valve discs facing the outer side of each said end wall, each secured to a shaft and arranged alternately to open and close the respective air inlets sequentially and a blower driven by said expansion motor to supply a stream of cooling air to said heat exchanger.

CHARLES J. THATCHER.

REFERENCES CITED

The following references are of record in the file of this patent:

UNITED STATES PATENTS

| Number | Name | Date |
|---|---|---|
| 290,600 | Palmer | Dec. 18, 1883 |
| 639,327 | Wilcox | Dec. 19, 1899 |
| 685,799 | Rousseau | Nov. 5, 1901 |
| 708,129 | Dahlen | Sept. 2, 1902 |
| 819,920 | Phifer | May 8, 1906 |
| 859,906 | Pollock et al. | July 2, 1907 |
| 925,467 | Eaton | June 22, 1909 |
| 1,170,807 | Egan | Feb. 8, 1916 |
| 2,078,295 | Thatcher | Apr. 27, 1937 |
| 2,098,558 | Anderson et al. | Nov. 9, 1937 |
| 2,124,289 | Ericson | July 19, 1938 |
| 2,174,584 | Imus | Oct. 3, 1939 |
| 2,187,492 | Frankenburg | Jan. 16, 1940 |
| 2,244,319 | Thatcher | June 23, 1941 |

FOREIGN PATENTS

| Number | Country | Date |
|---|---|---|
| 23,331 | Great Britain | Dec. 20, 1900 |
| 316,670 | Great Britain | July 26, 1929 |